3,646,004
BIS-(N-ACYLAMINO-PHTHALIMIDE)-
DISAZO DYESTUFFS
Walter Horstmann, Cologne, Dietmar Kalz, Leverkusen, Gerhard Wolfrum, Opladen, and Edgar Siegel, Leverkusen, Germany, assignors to Farbenfabriken Bayer Aktiengesellschaft, Leverkusen, Germany
No Drawing. Filed Nov. 26, 1968, Ser. No. 779,226
Claims priority, application Germany, Dec. 6, 1967,
P 16 44 237.8; Apr. 4, 1968, P 17 69 105.3
Int. Cl. C09b 33/02
U.S. Cl. 260—152         5 Claims

ABSTRACT OF THE DISCLOSURE

Azo dyestuffs free from sulfonic acid groups are prepared which are valuable new pigment dyestuffs characterized by good fastness to light, solvents and migration, and by a good thermal stability adapted for use in coloring papers, lacquers, and synthetic materials and for producing pigment paste and printing inks. The dyestuffs correspond to the general formula

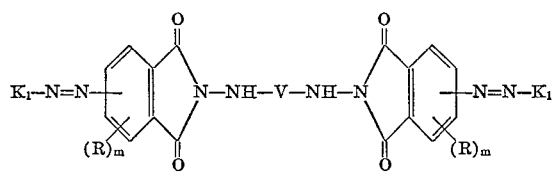

where V stands for a radical —OC—B—CO— or a radical

where B denotes a direct bond, an optionally substituted aliphatic, araliphatic, carbocyclic or heterocyclic radical, X stands for NH, O or S; $K_1$ denotes the radical of a monofunctional coupling component; R stands for identical or different substituents; and $m$ is an integer from 0 to 3.

The object of the present invention comprises valuable new azo dyestuffs of the formula

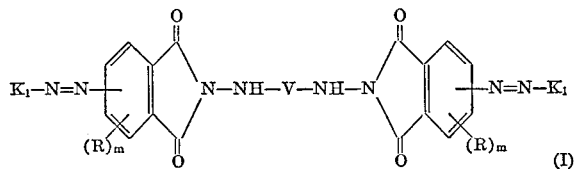

in which V stands for a radical —OC—B—CO— or a radical

where B means a direct bond, an optionally substituted aliphatic, araliphatic, carbocyclic or heterocyclic radical and X stands for NH, O or S; $K_1$ denotes the radical of a monofunctional coupling component; R stands for identical or different substituents; and $m$ represents and integer from 0 to 3.

Suitable dyestuffs are, for example, those of the formula

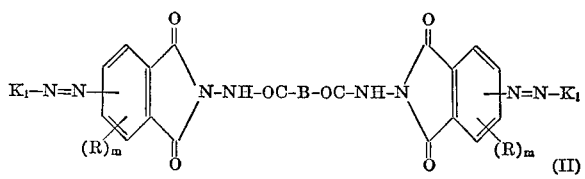

in which B stands for a direct bond, an optionally substituted aliphatic, aralyphatic, carbocyclic or heterocyclic radical; $K_1$ denotes the radical of a monofunctional coupling component; R stands for identical or different substituents; and $m$ represents an integer from 0 to 3, and those of the formula

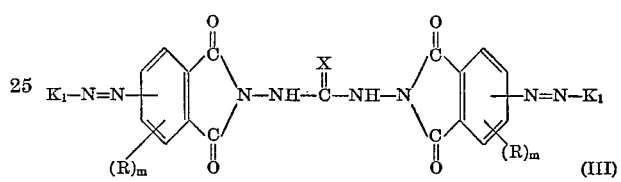

in which X stands for NH, O or S; $K_1$ denotes the radical of a monofunctional coupling component; R stands for identical or different substituents; and $m$ denotes an integer from 0 to 3.

Suitable aliphatic radicals B are, in particular, straight-chain or branched alkylene radicals which may be interrupted by hetero atoms or by carbocyclic radicals, for example, the radicals

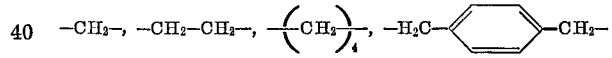

Suitable araliphatic radicals are, in particular, aralkylene radicals.

Suitable carbocyclic radicals are, in particular, optionally substituted phenylene and naphthylene radicals including, phenyl radicals which are linked by bridge members, such as the following, for example:

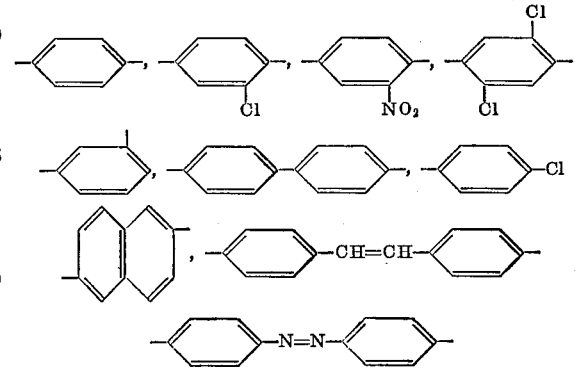

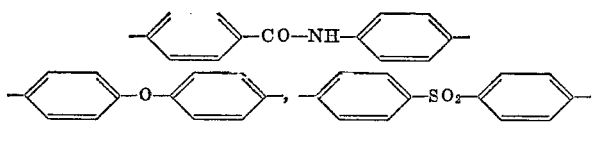

as well as cycloalkylene radicals, such as

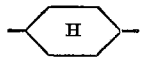

A suitable heterocyclic radical is, for example, the radical

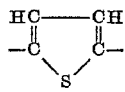

The following monofunctional coupling components $K_1$—H are of special interest: 2-hydroxy-naphthoic acid-(3)-arylides, acetoacetic acid-arylides, pyrazolones-(5) and 5-amino-pyrazoles.

Suitable substituents R are, for example, alkyl groups, such as methyl and ethyl groups; alkoxy groups, such as methoxy and ethoxy groups; halogen atoms, such as fluorine, chlorine, bromine; nitro groups and trifluoromethyl groups.

The new axo dyestuffs of the Formula II are obtained by reacting azo compounds of the formula

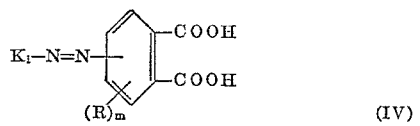

in which $K_1$, R and $m$ have the same meaning as above, or their functional derivatives, such as anhydrides, semiesters or neutral esters, with dicarboxylic acid hydrazides of the formula $$H_2N-HN-OC-B-CO-NH-NH_2 \quad (V)$$

in which B has the same meaning as above, in a molar ratio 2:1, optionally in the presence of suitable condensing agents, in a high-boiling, organic solvent, choosing the components so that the final dyestuffs are free from sulphonic acid groups. Preferred compounds (IV) are those of the formula

or their functional derivatives, which yield dyestuffs of the formula

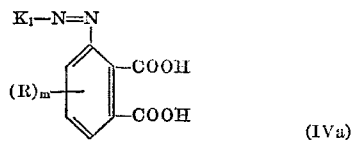

in which $K_1$, R, B and $m$ have the same meaning as above.

The new azo dyestuffs of the Formula III are obtained by reacting azo compounds of the Formula IV or their functional derivatives, such as anhydrides, semiesters or neutral esters, with compounds of the formula

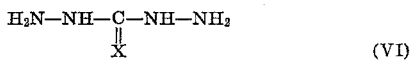

in which X means NH, O or S, in a molar ratio of 2:1, optionally in the presence of suitable condensation agents, in a high-boiling organic solvent, choosing the components so that the final dyestuffs are free from sulphonic acid groups. Preferred compounds (IV) are those of the Formula IVa or their functional derivatives, which yield dyestuffs of the formula

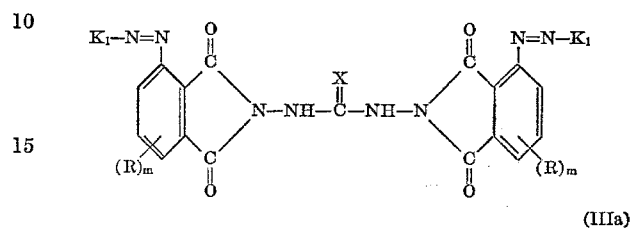

in which $K_1$, R, $m$ and X have the same meaning as above.

The starting dyestuffs of the Formulae II or IIa are obtained in conventional manner by diazotising the optionally substituted aminophthalic acids or their functional derivatives and by coupling with monofunctional coupling components.

Preferred dyestuffs are those of the formula

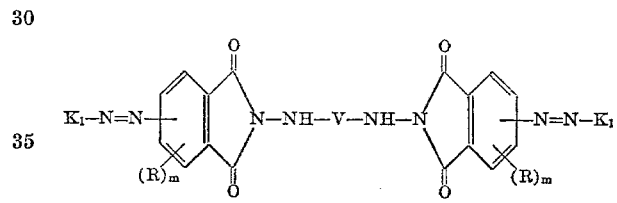

in which V is

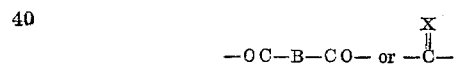

wherein B is a direct bond or a radical selected from the group consisting of alkylene with 1–4 carbon atoms; xylylene cyclohexylene; phenylene; phenylene substituted by 1 or 2 members Cl or $NO_2$ biphenylene; naphthylene

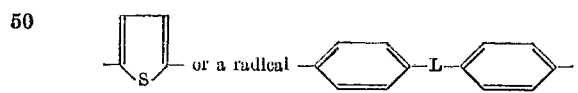

where

L is —CH=CH—, —N=N—, —CONH—, —O—, —$SO_2$—, or —$CH_2$—;
X is NH, S or O;

$K_1$ is selected from the group consisting of 2-hydroxy-naphthoic-acid-anilido; wherein the anilido residue of said 2-hydroxy-naphthoic-acid-anilido is unsubstituted or contains 1–3 substituents selected from the group consisting of methyl, methoxy, ethoxy, nitro, chloro, and acetylamino; 3-methyl-pyrazolonyl-5 which contains one substituent selected from the group consisting of phenyl, chlorophenyl, methylphenyl, nitrophenyl, carbonamido, and carbomethoxy; acetoacetic acid anilido wherein the anilido residue of said acetoacetic acid anilido is unsubstituted or contains 1–3 substituents selected from the group consisting of chloro, methyl, methoxy, ethoxy and nitro; 2-hydroxy-naphthoic-acid-naphthyl-amido; 2-hydroxy-naphthoylamino-benzimidazolonyl; 1 - phenyl - 3 - methyl - 5 - amino-pyrazolyl; acetoacetic acid naphthylamido, acetoacetic acid amino benzimidazolonyl; or acetoacetic acid aminobenzothiozolyl; and R is selected from the group consisting of methyl, ethyl, methoxy, ethoxy, fluoro, chloro, bromo, nitro or trifluoromethyl; and $m$ is an integer from 0–3.

Diazo components suitable for the production of the starting compounds (IV) or their functional derivatives are, for example, 3- and 4-amino-phthalic acid, 3-aminophthalic acid dimethyl ester, 3-amino-6-methyl-phthalic acid, 3 - amino - 5 - nitro - phthalic acid, 3 - amino - 6 - methoxy - phthalic acid, 3 - amino - 4 - methoxyphthalic acid, 3 - amino - 6 - chloro - phthalic acid, 3 - amino - 5,6 - dimethoxy - phthalic acid, 4 - amino - 3 - chloro - phthalic acid, 4 - amino - 5 - chloro - phthalic acid, 4 - amino - phthalic acid - dimethyl ester, 4 - amino - 3 - methyl - phthalic acid, 4 - amino - 5 - methyl - phthalic acid, 4 - amino - 3 - methoxy - phthalic acid, 4 - amino - 5 - methoxy - phthalic acid and 4 - amino - 3,6 - dichlorophthalic acid.

Monofunctional coupling components $K_1$—H which can be used are, for example:

2-hydroxy-naphthoic acid-(3)-anilide,
2-hydroxy-naphthoic acid-(3)-2'-methyl-anilide,
2-hydroxy-naphthoic acid-(3)-(4'-methyl)-anilide,
2-hydroxy-naphthoic acid-(3)-(2'-methoxy)-anilide,
2-hydroxy-naphthoic acid-(3)-(4'-methoxy)-anilide,
2-hydroxy-naphthoic acid-(3)-(3'-nitro)-anilide,
2-hydroxy-naphthoic acid-(3)-(2'-chloro)-anilide,
2-hydroxy-naphthoic acid-(3)-(4'-chloro)-anilide,
2-hydroxy-naphthoic acid-(3)-(2',4'-dimethyl)-anilide,
2-hydroxy-naphthoic acid-(3)-(2'-methyl-5'-chloro)-anilide,
2-hydroxy-naphthoic acid-(3)-(2'-methyl-4'-chloro)-anilide,
2-hydroxy-naphthoic acid-(3)-(2',5'-dimethoxy-4'-chloro)-anilide,
2-hydroxy-naphthoic acid-(3)-(2',4'-dimethoxy-5'-chloro)-anilide,
2-hydroxy-naphthoic acid-(3)-(2'-methyl-4'-methoxy)-anilide,
2-hydroxy-naphthoic acid-(3)-(2'-methoxy-5'-chloro)-anilide,
2-hydroxy-naphthoic acid-(3)-(2'-methyl-3'-chloro)-anilide,
2-hydroxy-naphthoic acid-(3)-(naphthyl-(1'))-amide,
2-hydroxy-naphthoic acid-(3)-(naphthyl-(2'))-amide,
2-hydroxy-naphthoic acid-(3)-(2'-ethoxy)-anilide,
2-hydroxy-naphthoic acid-(3)-(4'-ethoxy)-anilide,
2-hydroxy-naphthoic acid-(3)-(2-methoxy-5'-methyl)-anilide,
2-hydroxy-naphthoic acid-(3)-(4'-acetyl-amino)-anilide,
5-(2',3'-hydroxy-naphthoyl-amino)-benzimidazolone,
1-phenyl-3-methyl-pyrazolone-5,
1-(4'-chlorophenyl)-3-methyl-pyrazolone-5,
1-(4'-methylphenyl)-3-methyl-pyrazolone-5,
1-(3'-nitrophenyl)-3-methyl-pyrazolone-5,
1-(2'-chlorophenyl)-3-methyl-pyrazolone-5,
1-phenyl-pyrazolone-5-carboxylic acid-3-amide,
1-phenyl-pyrazolone-5-carboxylic acid-3-methyl ester,
1-phenyl-3-methyl-5-amino-pyrazolone.

Acetoacetic acid anilide, acetoacetic acid-2-chloro-anilide, acetoacetic acid - 2,4 - dimethyl-anilide, acetoacetic acid-2-methyl-anilide, acetoacetic acid-2,5-dimethoxy-4-chloro-anilide, acetoacetic acid-2-methoxy-anilide, acetoacetic acid-naphthyl-(1)-amide, acetoacetic acid-2-methyl-3-chloro-anilide, acetoacetic acid-2-methyl-4-chloro-anilide, acetoacetic acid-2,4-dichloro-anilide, acetoacetic acid-2-nitro-4-chloro-anilide, acetoacetic acid-2-nitro-4-methyl-anilide, acetoacetic acid-2-nitro - 4 - methoxy-anilide, acetoacetic acid-4-ethoxy-anilide, acetoacetic acid-2-(6-ethoxy-benzothiazolyl)-amide, 5-acetoacetyl-amino-benzimidazolone.

The condensation of the azo compounds (IV) or (IVa) with compounds of the type (V) or (VI) is preferably carried out in a high-boiling organic solvent and in the presence of dehydrating agents. The condensation is performed, for example, at an elevated temperature, generally ranging from 80 to 240° C., but preferably from 100° C. to 180° C., optionally under pressure.

Suitable compounds of the Formula V are, for example:

Oxalic acid dihydrazide, malonic acid dihydrazide, succinic acid dihydrazide, adipic acid dihydrazide, terephthalic acid dihydrazide, isophthalic acid dihydrazide, 4-chloro-isophthalic acid dihydrazide, 2,5-dichloro-terephthalic acid dihydrazide, 3-nitro-terephthalic acid dihycinic acid dihydrazide, adipic acid dihydrazide, terephdrazide, naphthalene-2,6-dicarboxylic acid dihydrazide, cycylohexane-1,4-dicarboxylic acid dihydrazide, thiophene-2,5-dicarboxylic acid dihydrazide, stilbene-dicarboxylic acid-4,4'-dihydrazide, azobenzene-dicarboxylic acid-4,4'-dihydrazide, diphenyl-dicarboxylic acid-4,4'-dihydrazide, diphenyl ether-dicarboxylic acid-4,4'-dihydrazide, benzanilide-dicarboxylic acid-4,4'-dihydrazide and diphenylmethane-dicarboxylic acid-4,4'-dihydrazide.

Suitable compounds of the Formula VI are, for example, N,N-diamino-guanidine, carbo-bishydrazide and thiocarbonhydrazide.

High-boiling, organic solvents suitable for the condensation of (IV) or (IVa) or their functional derivatives, for example of the corresponding anhydrides, with (V) or (VI) are, for example, the following solvents boiling above 80° C.: benzene, toluene, xylenes, chlorobenzene, o-, m-, p-dichlorobenzene, trichlorobenzenes, quinoline, nitrobenzene, glacial acetic acid, cyclohexane, 1,2,3,4-tetrahydro-naphthalene, naphthalene, tetrachloroethylene, anisole, diphenyl ether, di-n-butyl ether, decalin, and mixture of such solvents. Dehydrating agents to be concurrently used are preferably the following, for example: formic acid, acetic acid, propionic acid, anhydrous sodium acetate, zinc chloride, iron(III) chloride, aluminium chloride and boron trifluoride.

For the reaction of the monoazo dyestuffs (IV) or (IVa) or their anhydrides with compounds (III), (V) or (VI) the exact molar ratio 2:1 is to be chosen in order to obtain compounds (I) which are not contaminated with monoazo dyestuffs (III) or (IIIa). Dependent upon the use of the same or different compounds (IV) or (IVa), symmetric or asymmetric dyestuffs of the Formula I can be synthesised.

The products which can be obtained according to the present process are valuable new pigment dyestuffs which are, quite generally, characterised by good fastness to light, solvents and migration and also by a good thermal stability in substrates of the greatest variety. They are used for the colouring of paper, lacquers and synthetic materials, such as, for example, of plasticiser—containing polyvinyl chloride, polyethylene and acrylonitrile/butadiene styrene co- and graft-polymers, and for the production of pigment pastes and printing inks.

The parts in the following examples are parts by weight, the temperatures are given in degrees centigrade.

EXAMPLE 1

9.7 parts of the monoazo dyestuff obtained from diazotised 3-amino-phthalic acid and 2-hydroxy-naphtoic acid-(3)-(4'-methoxy)-anilide are heated at 100° for 30 minutes in a mixture of 200 parts chlorobenzene and 20 parts glacial acetic acid. 1.94 parts terephthalic acid dihydrazide are then added and the mixture is heated at 110–120° for a further 5 hours. The product is then filtered off with suction while hot, washed first with 150 parts of hot chlorobenzene, then with 100 parts of cold methanol and dried at 50° in a circulating air drying chamber. The yield amounts to 8.9 parts of a Bordeaux pigment which is fast to light and top finishes and corresponds to the formula

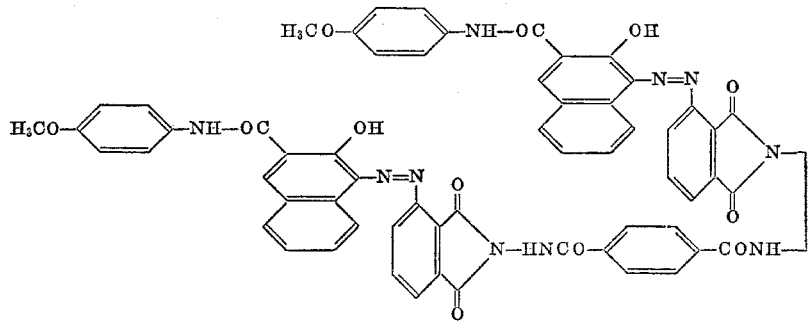

EXAMPLE 2

9.4 parts of the azo dyestuff obtained from diazotised 3-amino-phthalic acid and 2-hydroxy-naphthoic acid-(3)-(2'-methyl)-anilide and 1.74 parts adipic acid dihydrazide are heated at 120° for 4 hours in a mixture of 200 parts quinoline and 20 parts glacial acetic acid, the pigment is filtered off with suction at 100°, washed with equal portions of 200 parts quinoline and benzene, and dried at 80° in a vacuum until the weight remains constant. There are obtained 10.2 parts of a bluish red pigment which is resistant to solvents and has the constitution

EXAMPLE 3

9.7 parts of the pigment dyestuff obtained from diazotised 4-amino-phthalic acid and 2-hydroxy-naphthoic acid-(3)-(2'-methoxy)-anilide are heated at 100° for 30 minutes in a mixture of 150 parts o-dichlorobenzene and 15 parts glacial acetic acid. 2.7 parts 2,5-dichloro-terephthalic acid dihydrazide are then added and the mixture is kept at 120° for a further 3 hours; the product is filtered off with suction while hot, washed with warm quinoline and methanol, and dried at 50°. The yield amounts to 9.5 parts of a red pigment dyestuff of the formula

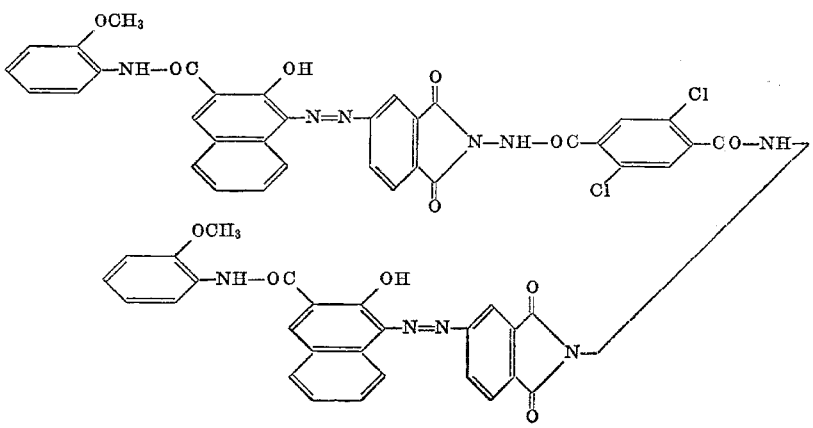

Valuable pigments are likewise obtained when the diazo, coupling and imidation components mentioned in Examples 1-3 are replaced with the components set out

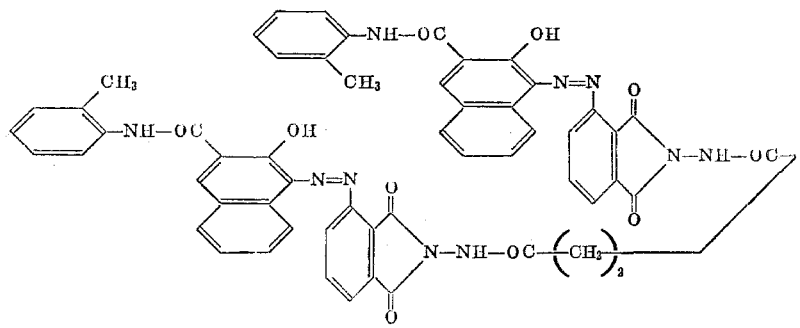

in the following table, which yields pigments of the specified shades.

while hot, washed first with chloro-benzene, then with methanol and dried at 50°. There is obtained in a good

| Diazo component | Coupling component | Imidation component | Shade |
|---|---|---|---|
| 3-amino-phthalic acid | 2-hydroxy-naphthoic acid-(3)-anilide | Oxalic acid dihydrazide | Red. |
| Do | do | Succinic acid dihydrazide | Red. |
| Do | do | Adipic acid dihydrazide | Red. |
| Do | do | Terephthalic acid dihydrazide | Red. |
| 4-amino-phthalic acid | do | Oxalic acid dihydrazide | Red. |
| Do | do | Malonic acid dihydrazide | Red. |
| Do | do | Succinic acid dihydrazide | Red. |
| Do | do | Adipic acid dihydrazide | Red. |
| Do | do | Terephthalic acid dihydrazide | Red. |
| Do | do | 2,5-dichloro-terephthalic acid dihydrazide | Red. |
| 3-amino-phthalic acid | 2-hydroxy-naphthoic acid-(3)-4'-ethoxy-anilide | Oxalic acid dihydrazide | Red. |
| Do | do | Succinic acid dihydrazide | Red. |
| Do | do | Terephthalic acid dihydrazide | Red. |
| Do | do | 4,4'-diphenyl-dicarboxylic acid dihydrazide | Red. |
| 4-amino-phthalic acid | do | Oxalic acid dihydrazide | Red. |
| Do | 2-hydroxy-naphthoic acid-(3)-4'-ethoxy-anilide | Malonic acid dihydrazide | Red. |
| Do | do | Succinic acid dihydrazide | Red. |
| Do | do | Terephthalic acid dihydrazide | Red. |
| Do | do | 2,5-dichloro-terephthalic acid dihydrazide | Red. |
| 3-amino-phthalic acid | 2-hydroxy-naphthoic acid-(3)-(4'-methoxy)-anilide | Oxalic acid dihydrazide | Red. |
| Do | do | Malonic acid dihydrazide | Red. |
| Do | do | Adipic acid dihydrazide | Red. |
| Do | do | 2,5-dichloro-terephthalic acid dihydrazide | Red. |
| Do | 2-hydroxy-naphthoic acid-(3)-(2'-methyl)-anilide | Oxalic acid dihydrazide | Red. |
| Do | do | Malonic acid dihydrazide | Red. |
| Do | do | Succinic acid dihydrazide | Red. |
| Do | do | Suberic acid dihydrazide | Red. |
| 4-amino-phthalic acid | do | Oxalic acid dihydrazide | Red. |
| Do | do | Succinic acid dihydrazide | Red. |
| Do | do | Terephthalic acid dihydrazide | Red. |
| Do | do | 2,5-dichloro-terephthalic acid dihydrazide | Red. |
| 3-amino-phthalic acid | 2-hydroxy-naphthoic acid-(3)-(4'-chloro)-anilide | Oxalic acid dihydrazide | Red. |
| Do | do | Succinic acid dihydrazide | Red. |
| Do | do | Naphthalene-2,6-dicarboxylic acid dihydrazide | Red. |
| Do | do | Adipic acid dihydrazide | Red. |
| 4-amino-phthalic acid | do | Oxalic acid dihydrazide | Red. |
| Do | do | Malonic acid dihydrazide | Red. |
| Do | do | Adipic acid dihydrazide | Red. |
| Do | do | Suberic acid dihydrazide | Red. |
| Do | 5-(2'-hydroxy-naphthoyl-(3')-amino)-benzimidazolone | Oxalic acid dihydrazide | Red. |
| Do | do | Succinic acid dihydrazide | Red. |
| Do | do | Adipic acid dihydrazide | Red. |
| Do | do | Suberic acid dihydrazide | Red. |
| 3-amino-phthalic acid | do | Oxalic acid dihydrazide | Red. |
| Do | do | Malonic acid dihydrazide | Red. |
| Do | do | Succinic acid dihydrazide | Red. |
| Do | do | Adipic acid dihydrazide | Red. |
| Do | do | Suberic acid dihydrazide | Red. |
| 4-amino-5-methoxy-phthalic acid | do | Oxalic acid dihydrazide | Red. |
| Do | do | Succinic acid dihydrazide | Red. |
| Do | do | Adipic acid dihydrazide | Red. |
| 3-amino-phthalic acid | 5-acetoacetylamino-benzimidazolone | Terephthalic acid dihydrazide | Yellow. |
| Do | do | Oxalic acid dihydrazide | Do. |
| 4-amino-phthalic acid | do | Succinic acid dihydrazide | Do. |
| Do | do | Terephthalic acid dihydrazide | Do. |
| Do | do | Adipic acid dihydrazide | Do. |
| Do | 1-phenyl-3-methyl-pyrazolone-5 | Terephthalic acid dihydrazide | Do. |
| Do | do | 2,5-dichloro terephthalic acid dihydrazide | Do. |
| Do | do | Oxalic acid dihyrdazide | Do. |
| Do | do | Adipic acid dihydrazide | Do. |
| 3-amino-phthalic acid | Acetoacetic acid-2,5-dimethoxy-4-chloro-anilide | Oxalic acid dihydrazide | Do. |
| Do | do | Malonic acid dihydrazide | Do. |
| Do | do | Succinic acid dihydrazide | Do. |
| Do | do | Terephthalic acid dihydrazide | Do. |
| 4-amino-phthalic acid | Acetoacetic acid-2,4-dimethyl-anilide | Oxalic acid dihydrazide | Do. |
| Do | do | Succinic acid dihydrazide | Do. |
| Do | do | Terephthalic acid dihydrazide | Do. |
| Do | do | Naphthalene-2,6-dicarboxylic acid dihydrazide | Do. |
| 3-amino-phthalic acid | 1-phenyl-3-methyl-pyrazolone-5 | Oxalic acid dihydrazide | Do. |
| Do | do | Malonic acid dihydrazide | Do. |
| Do | do | Succinic acid dihydrazide | Do. |
| Do | do | Terephthalic acid dihydrazide | Do. |
| Do | 1-phenyl-3-methyl-5-amino-pyrazole | Oxalic acid dihydrazide | Do. |
| Do | do | Malonic acid dihydrazide | Do. |
| Do | do | Terephthalic acid dihydrazide | Do. |
| 4-amino-phthalic acid | do | Oxalic acid dihydrazide | Do. |
| Do | do | Succinic acid dihydrazide | Do. |
| Do | do | Adipic acid dihydrazide | Do. |
| Do | do | Terephthalic acid dihydrazide | Do. |
| Do | do | 2,5-dichloro-terephthalic acid dihydrazide | Do. |

EXAMPLE 4

10.1 parts of the dyestuff obtained from diazotised 3-aminophthalic acid and 2-hydroxy-naphthoic acid-3-α-naphthylamide are heated at 100° for 30 minutes in a mixture of 150 parts o-dichlorobenzene and 15 parts glacial acetic acid. 1.9 parts terephthalic acid dihydrazide are then added and the mixture is heated at 120° for a further 3 hours. The product is filtered off with suction yield a bluish red dyestuff which yields, when incorporated into organic lacquers or synthetic materials, clear dyeings of very good fastness to light, top finishes and migration.

EXAMPLE 5

8.0 parts of the monoazo dyestuff obtained from diazotised 3-amino-phthalic acid and 1-(2'-chlorophenyl)-3-methyl-pyrazolone-(5) are heated at 100° for 30 minutes in a mixture of 200 parts chlorobenzene and 20 parts glacial acetic acid. 0.9 part carbobishydrazide are then added and heating is continued at 110–120° for 5 hours. The product is filtered off with suction while hot, washed with 150 parts of hot chlorobenzene, then with 100 parts methanol, and dried. There are obtained 8.1 parts of a yellow pigment dyestuff of the formula

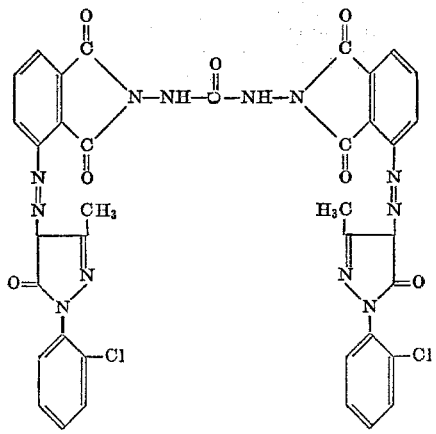

which is fast to light and migration.

EXAMPLE 6

9.26 parts of the monoazo dyestuff obtained from diazotised 3-amino-phthalic acid and acetoacetic acid-2,5-dimethoxy-4-chloro-anilide are heated in 200 parts 1,2,4-trichlorobenzene at 150° for 30 minutes. 0.9 part carbobishydrazide are then added, heating is continued at 140–150° for 5 hours, and the mixture is suction-filtered at 100°. The filter residue is washed with 50 parts chlorobenzene, then with 50 parts methanol, and dried. A yellow dyestuff is obtained which, when incorporated with organic lacquers or synthetic materials, has good fastness to light, top finishes and migration. It corresponds to the formula acid-(3)-(4'-methoxy)-anilide are heated in a mixture of 200 parts chlorobenzene and 20 parts glacial acetic acid at 100° for 30 minutes. 0.9 part carbo-bishydrazide are then added and heating is continued at 120° for 5 hours. The mixture is suction-filtered while hot, the filter residue is washed with 50 parts chlorobenzene, then with 50 parts methanol, and dried. There is obtained, in a good yield, a brown pigment dyestuff which has very good fastness to light, top finishes and migration, and corresponds to the following formula

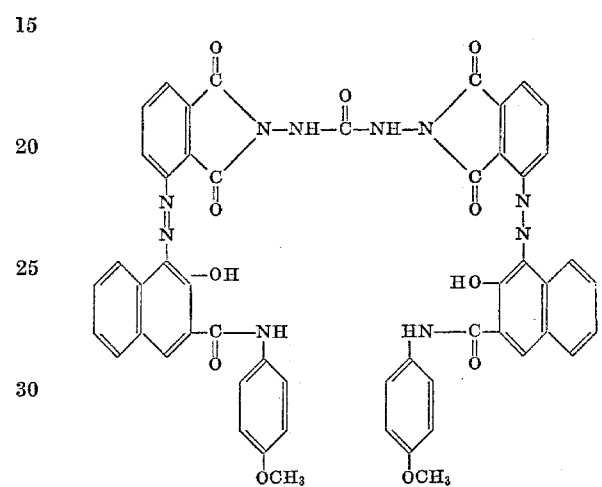

EXAMPLE 8

10.1 parts of the dyestuff obtained from diazotized 4-amino-phthalic acid and 2-hydroxy-naphthoic acid-(3)-α-naphthyl-amide are heated in a mixture of 150 parts over dichloro-benzene and 15 parts glacial acetic acid at 100°

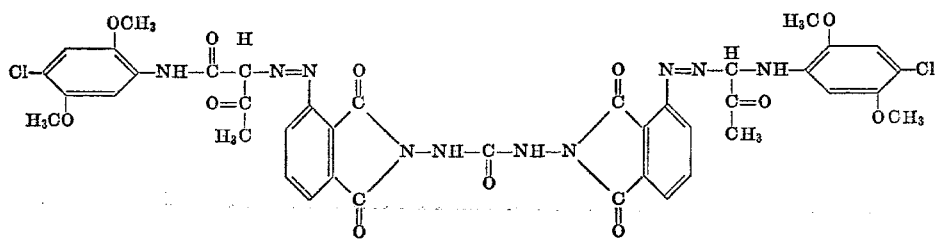

EXAMPLE 7

9.7 parts of the monoazo dyestuff obtained from diazotised 3-amino-phthalic acid and 2-hydroxy-naphthoic for 30 minutes. 0.89 part N,N'-diamino-guanidine are then added and heating is continued at 110° for 3 hours. The product is filtered off with suction while hot, washed with hot o-dichloro-benzene and methanol, and dried. A red pigment dyestuff of the formula

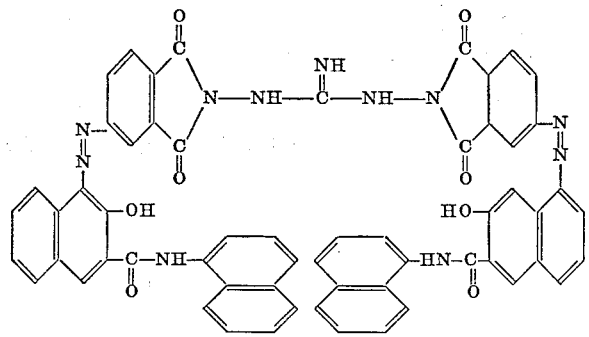

is obtained.

Valuable pigments are also obtained when the diazo, coupling and imidation components stated in Examples 5–8 are replaced with the components set out in the following table, which yield pigments of the specified shades.

We claim:
1. Azo dyestuffs which are free from sulfonic acid groups and correspond to the general formula

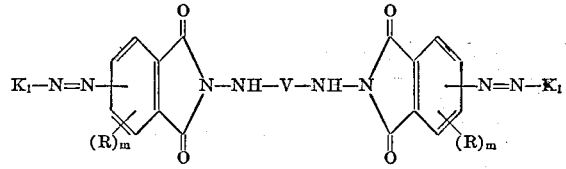

in which V is

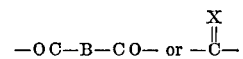

wherein B is a direct bond or a radical selected from the group consisting of alkylene with 1–4 carbon atoms; xylylene cyclohexylene; phenylene; phenylene substituted by 1 or 2 members Cl or $NO_2$: biphenylene; naphthylene

| Diazo component | Coupling component | Dihydrazide | Shade |
|---|---|---|---|
| 3-amino-phthalic acid | 3-methyl-pyrazolone-(5) | Carbo-bishydrzaide | Yellow. |
| Do | 1-phenyl-3-methyl-pyrazolone-(5) | Thiocarbohydrazide | Do. |
| Do | 1-(2-chloro-phenyl)-3-methyl-pyrazolone-(5) | N,N'-diamino-guanidine | Do. |
| Do | 1-phenyl-3-methyl-5-amino-pyrazole | Carbo-bishydrazide | Do. |
| Do | Acetoacetic acid-2,5-dimethoxy-4-chloro-anilide | N,N'-diamino-guanidine | Do. |
| Do | Acetoacetic acid-2,4-dimethyl-anilide | Thiocarbohydrazide | Do. |
| 4-amino-phthalic acid | 3-methyl-pyrazolone-(5) | Carbo-bishydrazide | Do. |
| Do | 1-phenyl-3-methyl-pyrazolone-(5) | Thiocarbohydrazide | Do. |
| Do | 1-(4-chloro-phenyl)-3-methyl-pyrazolone-(5) | do | Do. |
| Do | 1-phenyl-pyrazolone-(5)-carboxylic acid-(4)-amide | N,N'-diamino-guanidine | Do. |
| Do | 5-amino-pyrazole | Carbo-bishydrazide | Do. |
| Do | Acetoacetic acid-4-chloroanilide | do | Do. |
| 3-amino-phthalic acid | 2-hydroxy-naphthoic acid-(3)-anilide | do | Orange. |
| Do | | N,N'-diamino-guanidine | Red. |
| Do | 2-hydroxy-naphthoic acid-(3)-anilide | Carbo-bishydrazide | Orange. |
| Do | do | N,N'-diamino-guanidine | Red. |
| Do | do | Thiocarbohydrazide | Red. |
| 4-amino-phthalic acid | do | Carbo-bishydrazide | Orange. |
| Do | do | N,N'-diamino-guanidine | Red. |
| Do | do | Thiocarbohydrazide | Red. |
| 3-amino-phthalic acid | 2-hydroxy-naphthoic acid-(3)-(4'-chloro)-anilide | Carbo-bishydrazide | Red. |
| Do | do | N,N'-diamino-guanidine | Red. |
| Do | do | Thiocarbohydrazide | Red. |
| 4-amino-phthalic acid | do | Carbo-bishydrazide | Red. |
| Do | do | N,N'-diamino-guanidine | Red. |
| Do | do | Thiocarbohydrazide | Red. |
| 3-amino-phthalic acid | 2-hydroxy-naphthoic acid-(3)-(4'-methoxy)-anilide | N,N'-diamino-guanidine | Red-brown. |
| Do | do | Thiocarbohydrazide | Do. |
| 4-amino-phthalic acid | do | Carbo-bishydrazide | Do. |
| Do | do | N,N'-diamino-guanidine | Do. |
| Do | do | Thiocarbohydrazide | Do. |
| 3-amino-phthalic acid | 2-hydroxy-naphthoic acid-(3)-(4'-ethoxy)-anilide | Carbo-bishydrazide | Red. |
| Do | do | N,N'-diamino-guanidine | Red. |
| Do | do | Thiocarbohydrazide | Red. |
| 4-amino-phthalic acid | do | Carbo-bishydrazide | Red. |
| Do | do | N,N'-diamino-guanidine | Red. |
| Do | do | Thiocarbo-hydrazide | Red. |
| 3-amino-phthalic acid | 2-hydroxy-naphthoic acid-(3)-(2'-ethoxy)-anilide | Carbo-bishydrazide | Orange. |
| Do | do | N,N'-diamino-guanidine | Red. |
| Do | do | Thiocarbohydrazide | Red. |
| 4-amino-phthalic acid | do | Carbo-bishydrazide | Orange. |
| Do | do | N,N'-diamino-guanididn | Red. |
| Do | do | Thiocarbo-hydrazide | Red. |
| 3-amino-phthalic acid | 2-hydroxy-naphthoic acid-(3)-(2'-methyl)-anilide | Carbo-bishydrazide | Red. |
| Do | do | N,N'-diamino-guanidine | Red. |
| Do | do | Thiocarbohydrazide | Red. |
| 4-amino-phthalic acid | do | Carbo-bishydrazide | Red. |
| Do | do | N,N'-diamino-guanidine | Red. |
| Do | do | Thiocarbo-hydrazide | Red. |
| 3-amino-phthalic acid | 2-hydroxy-naphthoic acid-(3)-(3'-nitro)-anilide | Carbo-bishydrazide | Red. |
| Do | do | N,N'-diamino-guanidine | Red. |
| Do | do | Thiocarbohydrazide | Red. |
| 4-amino-phthalic acid | do | Carbo-bishydrazide | Red. |
| Do | do | N,N'-diamino-guanidine | Red. |
| Do | do | Thiocarbohydrazide | Red. |
| 3-amino-phthalic acid | 2-hydroxy-naphthoic acid-(3)-(2,5-dimethoxy)-anilide | Carbo-bishydrazide | Red-brown. |
| Do | do | N,N'-diamino-guanidine | Do. |
| Do | do | Thiocarbohydrazide | Do. |
| 4-amino-phthalic acid | do | Carbo-bishydrazide | Do. |
| Do | do | N,N'-diamino-guanidine | Do. |
| Do | do | Thiocarbohydrazide | Do. |
| 3-amino-phthalic acid | 2-hydroxy-naphthoic acid-(3)-(2',5'-dimethoxy-4'-chloro)-anilide | Carbo-bishydrazide | Brown. |
| Do | do | N,N'-diamino-guanidine | Do. |
| Do | do | Thiocarbohydrazide | Do. |
| 4-amino-phthalic acid | do | Carbo-bishydrazide | Do. |
| Do | do | N,N'-diamino-guanidine | Do. |
| Do | do | Thiocarbohydrazide | Do. |
| 3-amino-phthalic acid | 2-hydroxy-naphthoic acid-(3)-α-naphthylamide | Carbo-bishydrazide | Red. |
| Do | do | Thiocarbohydrazide | Red. |
| 4-amino-phthalic acid | do | Carbo-bishydrazide | Red. |
| Do | do | N,N'-diamino-guanidine | Red. |
| Do | do | Thiocarbohydrazide | Red | or a radical

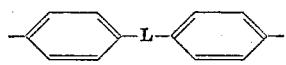

where
L is —CH=CH—, —N=N—, —CONH—, —O—, —SO$_2$—, or —CH$_2$—;
X is NH, S or O;
K$_1$ is selected from the group consisting of 2-hydroxy-naphthoic-acid-anilido; wherein the anilido residue of said 2-hydroxy-naphthoic-acid-anilido is unsubstituted or contains 1-3 substituents selected from the group consisting of methyl, methoxy, ethoxy, nitro, chloro, and acetylamino; 3-methyl-pyrazolonyl-5 which contains one substituent selected from the group consisting of phenyl, chlorophenyl, methylphenyl, nitrophenyl, carbonamido, and carbomethoxy; acetoacetic acid anilido wherein the anilido residue of said acetoacetic acid anilido is unsubstituted or contains 1-3 substituents selected from the group consisting of chloro, methyl, methoxy, ethoxy and nitro; 2-hydroxy-naphthoic-acid-naphthyl-amido; 2-hydroxy-naphthoylamino-benzimidazolonyl; 1-phenyl-3-methyl-5-amino-pyrazolyl; acetoacetic acid naphthylamido, acetoacetic acid amino benzimidazolonyl; or acetoacetic acid aminobenzothiazolyl; and
R is selected from the group consisting of methyl, ethyl, methoxy, ethoxy, fluoro, chloro, bromo, nitro or trifluoromethyl; and
m is an integer from 0–3.

2. Azo dyestuffs of claim 1 which correspond to the general formula

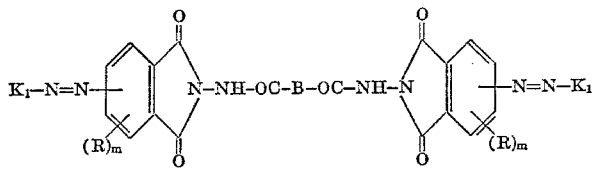

wherein B, K$_1$, R and m are as defined in claim 1.

3. Dyestuffs of claim 2 which correspond to the formula

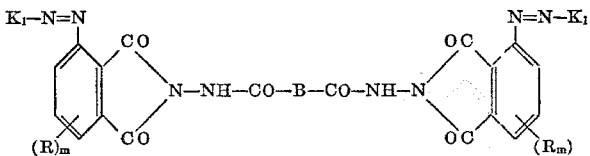

4. Azo dyestuffs of claim 1 which correspond to the formula

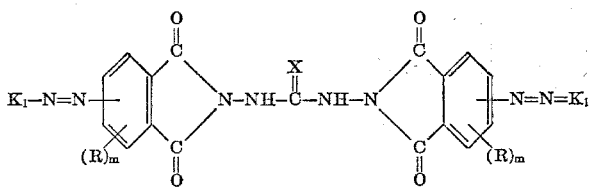

5. Azo dyestuffs of claim 4 corresponding to the formula

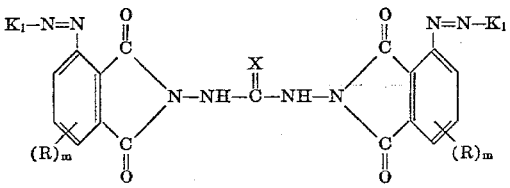

References Cited
FOREIGN PATENTS
6,701,983    9/1967    Netherlands _____ 260—152

HENRY R. JILES, Primary Examiner
D. M. PAPUGA, Assistant Examiner

U.S. Cl. X.R.
260—157, 158, 160, 173; 106—22, 288; 117—138.8, 154